US010777084B1

(12) United States Patent
Vora et al.

(10) Patent No.: US 10,777,084 B1
(45) Date of Patent: Sep. 15, 2020

(54) VEHICLE LOCATION IDENTIFICATION

(71) Applicant: Ford Global Technologies, LLC, Dearborn, MI (US)

(72) Inventors: Ankit Girish Vora, Dearborn, MI (US); Siddharth Agarwal, Dearborn, MI (US); Sangjin Lee, Taylor, MI (US); Krishanth Krishnan, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/515,482

(22) Filed: Jul. 18, 2019

(51) Int. Cl.
*H04W 4/46* (2018.01)
*H04W 4/029* (2018.01)
*G08G 1/00* (2006.01)

(52) U.S. Cl.
CPC .............. *G08G 1/20* (2013.01); *G08G 1/22* (2013.01); *H04W 4/029* (2018.02); *H04W 4/46* (2018.02)

(58) Field of Classification Search
CPC ............ G08G 1/20; G08G 1/22; G08G 1/161; H04W 4/46; H04W 4/029; G01S 19/40; G01S 19/05; G01S 19/07; G01S 19/41; G01S 19/51; G01S 5/0072; B60W 50/00; G05D 1/02; G05D 1/0295; G05D 2201/0213
See application file for complete search history.

(56) References Cited

U.S. PATENT DOCUMENTS

| | | | |
|---|---|---|---|
| 7,546,182 B2 | 6/2009 | Mudalige | |
| 2013/0116908 A1* | 5/2013 | Oh | G01S 19/07 701/96 |
| 2013/0278440 A1* | 10/2013 | Rubin | G08G 9/02 340/903 |
| 2017/0243485 A1* | 8/2017 | Rubin | G08G 1/052 |
| 2019/0179327 A1* | 6/2019 | Martin | G05D 1/0221 |
| 2019/0377341 A1* | 12/2019 | Choi | G05D 1/0276 |

FOREIGN PATENT DOCUMENTS

| | | | | |
|---|---|---|---|---|
| WO | 2018230768 A1 | 12/2018 | | |
| WO | WO-2018230768 A1 * | 12/2018 | ............... | G05D 1/02 |

* cited by examiner

*Primary Examiner* — George Eng
*Assistant Examiner* — Umair Ahsan
(74) *Attorney, Agent, or Firm* — Frank A. MacKenzie; Bejin Bieneman PCL

(57) ABSTRACT

A computer includes a processor and a memory. The memory stores instructions executable by the processor to receive in a host vehicle, from a target vehicle via wireless vehicle-to-vehicle communications, a target vehicle first location in a global coordinate system, determine a target vehicle second location in a local coordinate system that has an origin at the host vehicle, and identify a host vehicle location in the global coordinate system based solely on (i) local coordinate system data determined in the host vehicle, including the target vehicle second location and (ii) data in the vehicle-to-vehicle communications, including the target vehicle first location.

20 Claims, 3 Drawing Sheets

VEHICLE LOCATION IDENTIFICATION

BACKGROUND

Vehicles use sensors to collect data while operating, the sensors including radar, LIDAR, vision systems, infrared systems, and ultrasonic transducers. Vehicles can actuate the sensors to collect data while traveling along roadways. Based on the data, it is possible to determine vehicle operating parameters. For example, sensor data can indicate a location, a speed, an acceleration, etc., of a vehicle.

DETAILED DESCRIPTION

Figure 1:
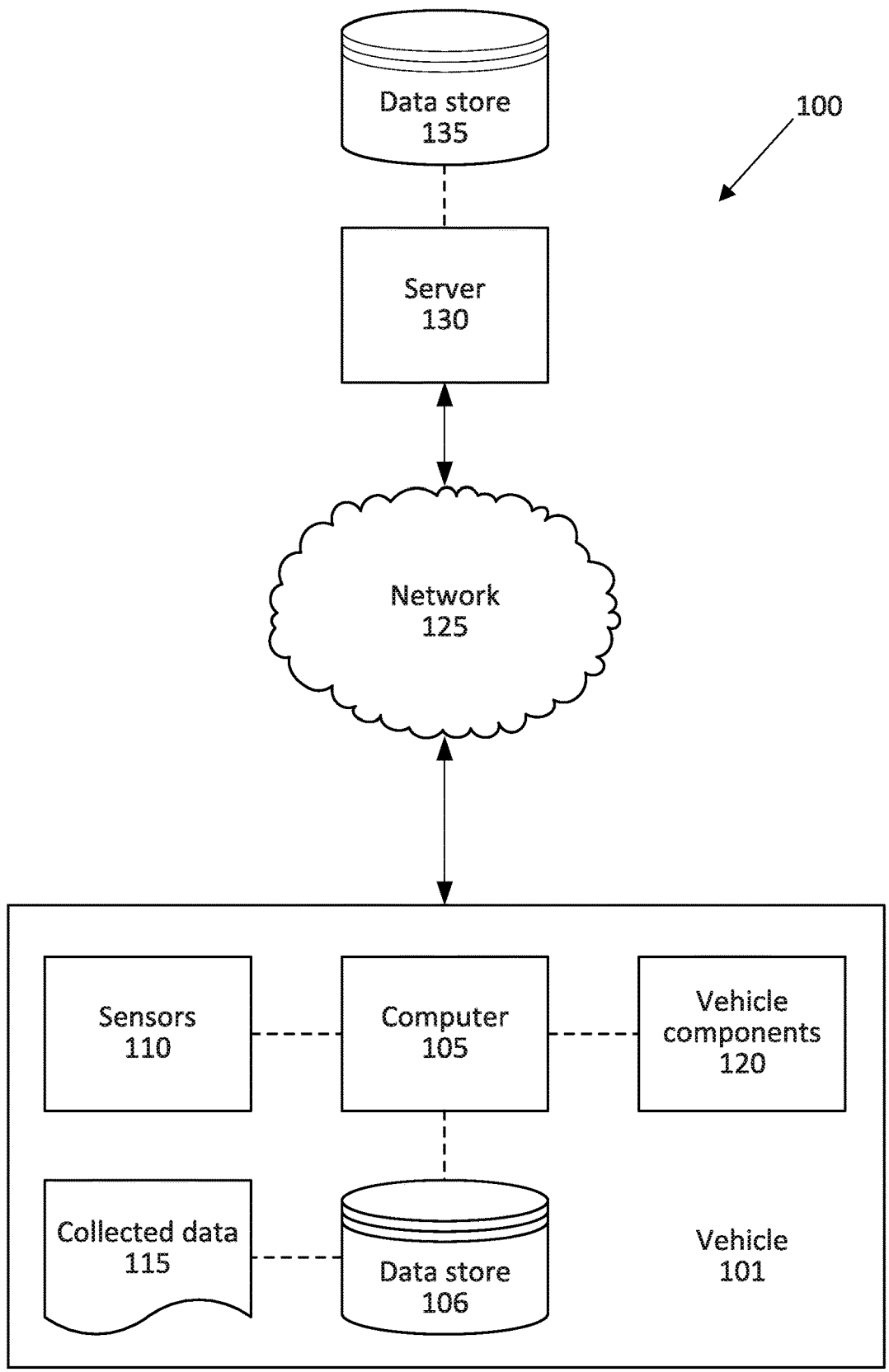
FIG. 1 is a block diagram of an example system for determining a location of a vehicle.

A computer includes a processor and a memory, the memory storing instructions executable by the processor to receive in a host vehicle, from a target vehicle via wireless vehicle-to-vehicle communications, a target vehicle first location in a global coordinate system, determine a target vehicle second location in a local coordinate system that has an origin at the host vehicle, and identify a host vehicle location in the global coordinate system based solely on (i) local coordinate system data determined in the host vehicle, including the target vehicle second location and (ii) data in the vehicle-to-vehicle communications, including the target vehicle first location.

The instructions can further include instructions to identify the location of the host vehicle based on a resolution error of the target vehicle first location.

The instructions can further include instructions to receive sensor data from the target vehicle and to deactivate one or more sensors in the host vehicle that collect a same type of sensor data as the received sensor data.

The instructions can further include instructions to receive a second target vehicle first location in the global coordinate system via wireless vehicle-to-vehicle communications, to determine a second target vehicle second location in the local coordinate system, and to identify the host vehicle location in the global coordinate system based on the second target vehicle first location and the second target vehicle second location.

The instructions can further include instructions to input images of the target vehicle into a machine learning program to identify the location of the target vehicle in the local coordinate system.

The instructions can further include instructions to receive respective locations of each of a plurality of vehicles in the global coordinate system via vehicle-to-vehicle communications and to determine the location of the host vehicle in the global coordinate system based on the received locations.

The instructions can further include instructions to determine the location of the host vehicle in the global coordinate system based on locations of a plurality of vehicles in the local coordinate system.

The target vehicle can be a lead vehicle in a platoon, and the host vehicle is in the platoon.

A method includes receiving in a host vehicle, from a target vehicle via wireless vehicle-to-vehicle communications, a target vehicle first location in a global coordinate system, determining a target vehicle second location in a local coordinate system that has an origin at the host vehicle, and identifying a host vehicle location in the global coordinate system based solely on (i) local coordinate system data determined in the host vehicle, including the target vehicle second location and (ii) data in the vehicle-to-vehicle communications, including the target vehicle first location.

The method can further include identifying the location of the host vehicle based on a resolution error of the location of the target vehicle in the global coordinate system.

The method can further include receiving sensor data from the target vehicle and deactivating one or more sensors in the host vehicle that collect a same type of sensor data as the received sensor data.

The method can further include receiving a second target vehicle first location in the global coordinate system via wireless vehicle-to-vehicle communications, determining a second target vehicle second location in the local coordinate system, and identifying the host vehicle location in the global coordinate system based on the second target vehicle first location and the second target vehicle second location.

The method can further include inputting images of the target vehicle into a machine learning program to identify the location of the target vehicle in the local coordinate system.

The method can further include receiving respective locations of each of a plurality of vehicles in the global coordinate system via wireless vehicle-to-vehicle communications and determining the location of the host vehicle in the global coordinate system based on the received locations.

The method can further include determining the location of the host vehicle in the global coordinate system based on locations of a plurality of vehicles in the local coordinate system.

A system includes a vehicle sensor, means for receiving in a host vehicle, from a target vehicle via wireless vehicle-to-vehicle communications, a target vehicle first location in a global coordinate system, means for determining a target vehicle second location in a local coordinate system that has an origin at the host vehicle with the vehicle sensor, and means for identifying a host vehicle location in the global coordinate system based solely on (i) local coordinate system data determined in the host vehicle, including the target vehicle second location and (ii) data in the vehicle-to-vehicle communications, including the target vehicle first location.

The system can further include means for receiving sensor data from the target vehicle and deactivating one or more sensors in the host vehicle that collect a same type of sensor data as the received sensor data.

The system can further include means for receiving a second target vehicle first location in the global coordinate system via wireless vehicle-to-vehicle communications, determining a second target vehicle second location in the local coordinate system, and identifying the host vehicle location in the global coordinate system based on the second target vehicle first location and the second target vehicle second location.

The system can further include means for receiving respective locations of each of a plurality of vehicles in the global coordinate system via wireless vehicle-to-vehicle communications and determining the location of the host vehicle in the global coordinate system based on the received locations.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Vehicles use localization techniques to determine locations for operation, e.g., navigation, collision avoidance, etc. Localization can require a plurality of complex sensors, e.g., lidar, high-resolution GPS, etc. Advantageously, as disclosed herein, a vehicle lacking one or more of these complex sensors can perform localization techniques based on a location of another vehicle with the complex sensors. That is, a master vehicle that has sensors sufficient to determine its location with high accuracy can transmit its location to one or more nearby vehicles over a communications medium such as V2V (vehicle-to-vehicle) communications, and a nearby vehicle can determine its respective location based on the received location and a distance from the master vehicle to the respective nearby vehicle. Thus, nearby vehicles that lack the complex sensors to use localization techniques can determine their respective locations in a global coordinate system. When the vehicles include sensors that can perform the localization techniques, using the master vehicle to transmit its location to the vehicles allows the vehicles to deactivate the sensors, reducing power expenditure of the vehicles.

FIG. 1 illustrates an example system 100 for determining a location of a vehicle 101. The system 100 includes a computer 105. The computer 105, typically included in a vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or nonvolatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, lidar, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a cleaning component, a park assist component, an adaptive cruise control component, an adaptive steering component, a movable seat, or the like. For the avoidance of doubt, note that the components 120 further include the sensors 110; the sensors 110 are identified with a separate reference numeral herein for convenience, e.g., some of the following discussion of sensors 110 involves sensing capabilities, etc., and does not pertain to other components 120.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) and/or vehicle-to-infrastructure (V2X) such as Dedicated Short Range Communications (DSRC), etc.), local area networks (LAN) and/or wide area networks (WAN), including the Internet, providing data communication services.

Figure 2:
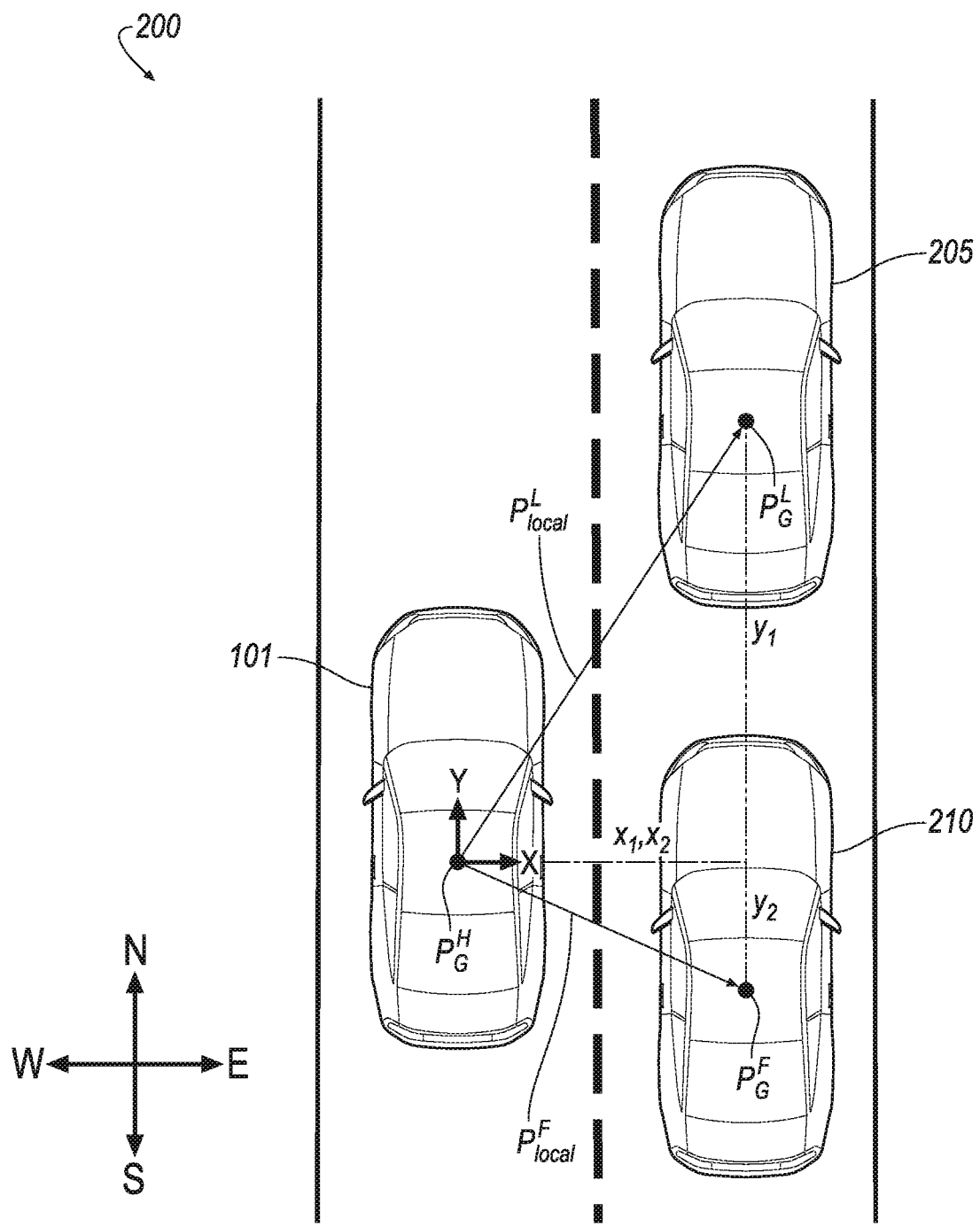
FIG. 2 is a plan view of a platoon.

FIG. 2 is a plan view of a platoon 200, i.e., a plurality of vehicles that travel together along a roadway. The platoon 200 includes a host vehicle 101 and a plurality of target vehicles, including a lead vehicle 205 and a following vehicle 210. In the platoon 200, the lead vehicle 205 transmits information to the following vehicle 210 and the host vehicle 101 over the network 125, e.g., V2V communications. For example, the lead vehicle 205 can transmit a location of the lead vehicle 205 in a global coordinate system, as described below, and the following vehicle 210 and the host vehicle 101 can determine their respective locations in the global coordinate system based on the location of the lead vehicle 205 in the global coordinate system, as described below. In the example of FIG. 2, the host vehicle 101 and the following vehicle 210 are in a platoon 200 with the lead vehicle 205. Alternatively, the host vehicle 101, the lead vehicle 205, and the following vehicle 210 can operate separately, i.e., not in a platoon 200, and respective operators can operate the host vehicle 101 and/or the following vehicle 210 toward different respective destinations. Yet further alternatively, the platoon 200 can include more than one following vehicle 210, e.g., two, four, etc. Thus, the host vehicle 101 and the following vehicle 210 can reduce sensor operation, reducing power expenditure while traveling in the platoon 200.

The lead vehicle 205 can transmit data 115 from one or more sensors 110 to the host vehicle 101 and the following vehicle 210 over the network 125. The lead vehicle 205 can provide data 115 to the host vehicle 101 and the following vehicle 210 over the network 125 (e.g., V2V communications) that the host vehicle 101 and the following vehicle 210 may not collect. For example, the lead vehicle 205 can generate a data point cloud from data 115 from a lidar 110 and transmit the data point cloud to the computer 105 and the following vehicle 210 over the network 125. The host vehicle 101 and the following vehicle 210 may lack one or more sensors 110 that the lead vehicle 205 has, e.g., a lidar, high-resolution location detection, etc. Alternatively, upon identifying the lead vehicle 205, the host vehicle 101 and the following vehicle 210 can deactivate one or more sensors 110 to reduce power consumption of respective vehicle 101, 210 batteries, relying on data 115 from the lead vehicle 205.

The lead vehicle 205 determines its location in the global coordinate system. In this context, the "global coordinate system" is a geo-location longitude and latitude coordinate system where coordinates are specified for the surface of the earth according to a fixed origin, i.e., an origin that does not change as an object moves and that does not depend on the location of any object with respect to the coordinate system, e.g., a Global Navigation Satellite System (GNSS) such as the Global Positioning System (GPS), longitudinal and lateral axes of a global coordinate system being shown as north-south and east-west axes in a compass rose in FIG. 2. The lead vehicle 205 can send a signal to the server 130 requesting the location of the lead vehicle 205 in the global coordinate system, e.g., GPS coordinates indicating a latitude and a longitude of the lead vehicle 205. Upon receiving the location of the lead vehicle 205, the lead vehicle 205 can transmit the location (i.e., the latitude and the longitude as a set of coordinates) to the host vehicle 101 and the following vehicle 210 over the network 125.

The host vehicle 101 can determine the location of the lead vehicle 205 in a local coordinate system. In this context, a "local coordinate system" of the host vehicle 101 is a two-dimensional coordinate system having an origin that is a point on and/or in the host vehicle 101. For example, the origin can be a center point of the host vehicle 101, as shown in FIG. 2. The origin can be a predetermined point on the host vehicle 101 stored in the data store 106. The local coordinate system has a lateral axis X and a longitudinal axis Y extending from the origin. The host vehicle 101 can identify the location of the lead vehicle 205 in the local coordinate system. That is, the computer 105 can actuate one or more sensors 110 to detect the lead vehicle 205, e.g., the computer 105 can actuate a radar to determine a distance between the host vehicle 101 and the lead vehicle 205. In another example, the computer 105 can actuate a camera 110 to collect images of the lead vehicle 205 and an input the images to an image-recognition algorithm such as a machine learning program. The machine learning program can be a neural network trained with reference images of vehicles and reference distances to the vehicles in the images. Coefficients of a cost function can be adjusted by a conventional technique such as gradient descent to train the neural network to output an identification of the lead vehicle 205 and a distance between the host vehicle 101 and the lead vehicle 205. Thus, the computer 105 can input images of the lead vehicle 205 to the machine learning program to output a distance between the host vehicle 101 and the lead vehicle 205.

Upon detecting the lead vehicle 205, the computer 105 can determine a location of the lead vehicle 205 in the local coordinate system, assigning a coordinate x along the lateral axis X and a coordinate y along the longitudinal axis Y indicating the location of the lead vehicle 205. In general, the coordinates (x, y) represent the component vectors of the distance between the host vehicle 101 and one of the lead vehicle 205 or the following vehicle 210, i.e., the component of the distance extending along the lateral axis X and the component of the distance extending along the longitudinal axis Y. In the example of FIG. 2, the coordinates $(x_1, y_1)$ represent the component vectors of the distance between the host vehicle 101 and the lead vehicle 205 in the local coordinate system and the coordinates $(x_2, y_2)$ represent the component vectors of the distance between the host vehicle 101 and the following vehicle 210 in the local coordinate system.

The computer 105 determines a location of the host vehicle 101 in the global coordinate system. The computer 105 can determine the location of the host vehicle 101 in the global coordinate system based on the location of the lead vehicle 205 in the local coordinate system. That is, the position of the lead vehicle 205 in the global coordinate system can be determined as:

$$P_G^L = P'_G^L + \Delta e_L \quad (1)$$

where $P_G^L$ is the position of the lead vehicle 205 in the global coordinate system, $P'_G^L$ is the position of the lead vehicle 205 as detected by a computer of the lead vehicle 205 (i.e., the latitude and longitude as detected by the sensors of the lead vehicle 205), and $\Delta e_L$ is a localization error, i.e., a resolution error of the position of the lead vehicle 205. In this context, a "localization error" is a difference of the position determined by a vehicle 101, 205, 210 from an actual (or "ground truth) position of the vehicle 101, 205, 210, typically resulting from tolerances of sensors 110 and/or navigation satellite systems as described above. That is, the localization error is an area about, i.e., around, a location of the lead vehicle 205 determined from sensor 110 data. The localization error can be e.g., a root-mean-square of a latitude resolution error and a longitude resolution error of global position coordinates from the server 130. A "resolution error" is a minimum size of data collectable by a sensor 110 and/or a navigation satellite system as described above. That is, the resolution error is the deviation from a coordinate by the resolution of the sensor 110 and/or system providing the data 115 in the respective coordinate system. The lead vehicle 205 can transmit the position $P'_G^L$ and the localization error $\Delta e_L$ to the computer 105 over the network 125.

The computer 105 can determine the position of the host vehicle 101 in the global coordinate system based on a position of lead vehicle 205 in the local coordinate system and the position of the lead vehicle 205 in the global coordinate system. That is, the position of the host vehicle 101 in the global coordinate system is the relative difference in latitude and longitude of the host vehicle 101 from the lead vehicle 205. The relative difference is the distance from the host vehicle 101 to the lead vehicle 205, i.e., the position of the lead vehicle 205 in the local coordinate system. Thus, the position of the host vehicle 101 in the global coordinate system can be expressed as the vector sum of the position of the lead vehicle 205 in the global coordinate system and the position of the lead vehicle 205 in the local coordinate system:

$$P_G^H = P'^L_G + \Delta e_L - P_{local}^L + \Delta e_{local} \qquad (2)$$

where $P_G^H$ is the position of the host vehicle 101 in the global coordinate system, $P_{local}^L$ is the position of the lead vehicle 205 in the local coordinate system, and $\Delta e_{local}$ is a localization error, i.e., a resolution error, of the position of the lead vehicle 205 in the local coordinate system. The localization error can be, e.g., a root-mean-square of a lateral resolution error and a longitudinal resolution error of a sensor 110 collecting data 115 in the local coordinate system. That is, the position of host vehicle 101 in the global coordinate system is the vector sum of the position of the lead vehicle 205 in the global coordinate system $P'^L_G$ and the component vectors from the host vehicle 101 to the lead vehicle 205 $P_{local}^L$. As shown in Equation 2, to determine the position of the host vehicle 101 in the global coordinate system, the computer 105 starts at the position of the lead vehicle 205 in the global coordinate system, then moves along the lateral X axis by the lateral component $x_1$ of the position of the lead vehicle 205 in the local coordinate system, and then moves along the longitudinal Y axis by the longitudinal component $y_1$ of the position of the lead vehicle 205 in the local coordinate system. In other words, $P_{local}^L = (x_1, y_1)$.

The computer 105 of the host vehicle 101 can receive the position of the lead vehicle 205 in the global coordinate system $P'^L_G + \Delta e_L$ from the lead vehicle 205 over the network 125, and the computer 105 can determine the position of the lead vehicle 205 in the local coordinate system $P_{local}^L$ based on data 115 from one or more sensors 110 of the host vehicle 101. That is, the computer 105 can actuate one or more sensors 110, e.g., a camera, to detect the location of the lead vehicle 205 in the local coordinate system. For example, upon receiving images from a camera 110 of the lead vehicle 205, the computer 105 can use a conventional image recognition algorithm (e.g., Canny edge detection) to determine the distance between the host vehicle 101 and the lead vehicle 205 and the location of the lead vehicle 205 in the local coordinate system $(x_1, y_1)$. Thus, the computer 105 can identify the position of the host vehicle 101 in the global coordinate system without using advanced sensors 110 such as high-resolution GPS and/or lidar, reducing power consumption and computations of the computer 105.

The computer 105 can determine the position of the host vehicle 101 in the global coordinate system based on a position of the following vehicle 210 in the global coordinate system. That is, in addition to determining the position of the host vehicle 101 based on the position of the lead vehicle 205, the computer 105 can receive a position of the following vehicle 210 in the global coordinate system to determine the position of the host vehicle 101 in the global coordinate system. The following vehicle 210 includes a computer that can determine the position of the following vehicle 210 in the global coordinate system based on the received position of the lead vehicle 205 in the global coordinate system, as described above with respect to the host vehicle 101. That is, the following vehicle 210 can apply Equations 1-2 substituting its location to determine the location of the following vehicle 210 in the global coordinate system $P_G^F$. The computer 105 can receive the position of the following vehicle 210 in the global coordinate system $P_G^F$ and, with Equations 1-2 above, determine the position of the host vehicle 101 in the global coordinate system. That is, the computer 105 can apply Equations 1-2 to the position of the following vehicle 210 in the local coordinate system $(x_2, y_2)$ and the received position of the following vehicle 210 in the global coordinate system $P_G^F$. Thus, the computer 105 can determine the location of the host vehicle 101 in the global coordinate system based on locations of a plurality of vehicles 205, 210 in the local coordinate system. That is, the computer 105 can receive respective locations of each of a plurality of vehicles (e.g., the lead vehicle 205, one or more following vehicles 210, etc.) in the global coordinate system via vehicle-to-vehicle communications and can determine the location of the host vehicle 101 in the global coordinate system based on the received locations. By determining the position of the host vehicle 101 in the global coordinate system based on received locations of the lead vehicle 205 and one or more following vehicles 210, the computer 105 can perform redundant determinations of the position of the host vehicle 101 to improve precision of the determined position.

Upon determining the position of the host vehicle 101 in the global coordinate system, the computer 105 can actuate one or more components 120 to move the host vehicle 101 along the roadway. That is, moving the host vehicle 101 from an origin to a destination in an autonomous mode typically requires the localized position of the host vehicle 101 in the global coordinate system. The computer 105 can use the position of the host vehicle 101 to plan a route and a trajectory from the origin to the destination and can actuate a propulsion 120, a steering component 120, and a brake 120 according to the route and the trajectory to move the host vehicle 101 from the origin to the destination. In another example, the computer 105 can use the position of the host vehicle 101 in the global coordinate system to perform collision mitigation and avoidance with other vehicles 205, 210. That is, based on the positions of the host vehicle 101, the lead vehicle 205, and the following vehicle 210 in the global coordinate system, the computer 105 can determine the likelihood of a collision with, e.g., a conventional collision threat technique that determines a steering, braking, or acceleration of the host vehicle 101 to avoid the lead vehicle 205 and/or the following vehicle 210.

Figure 3:
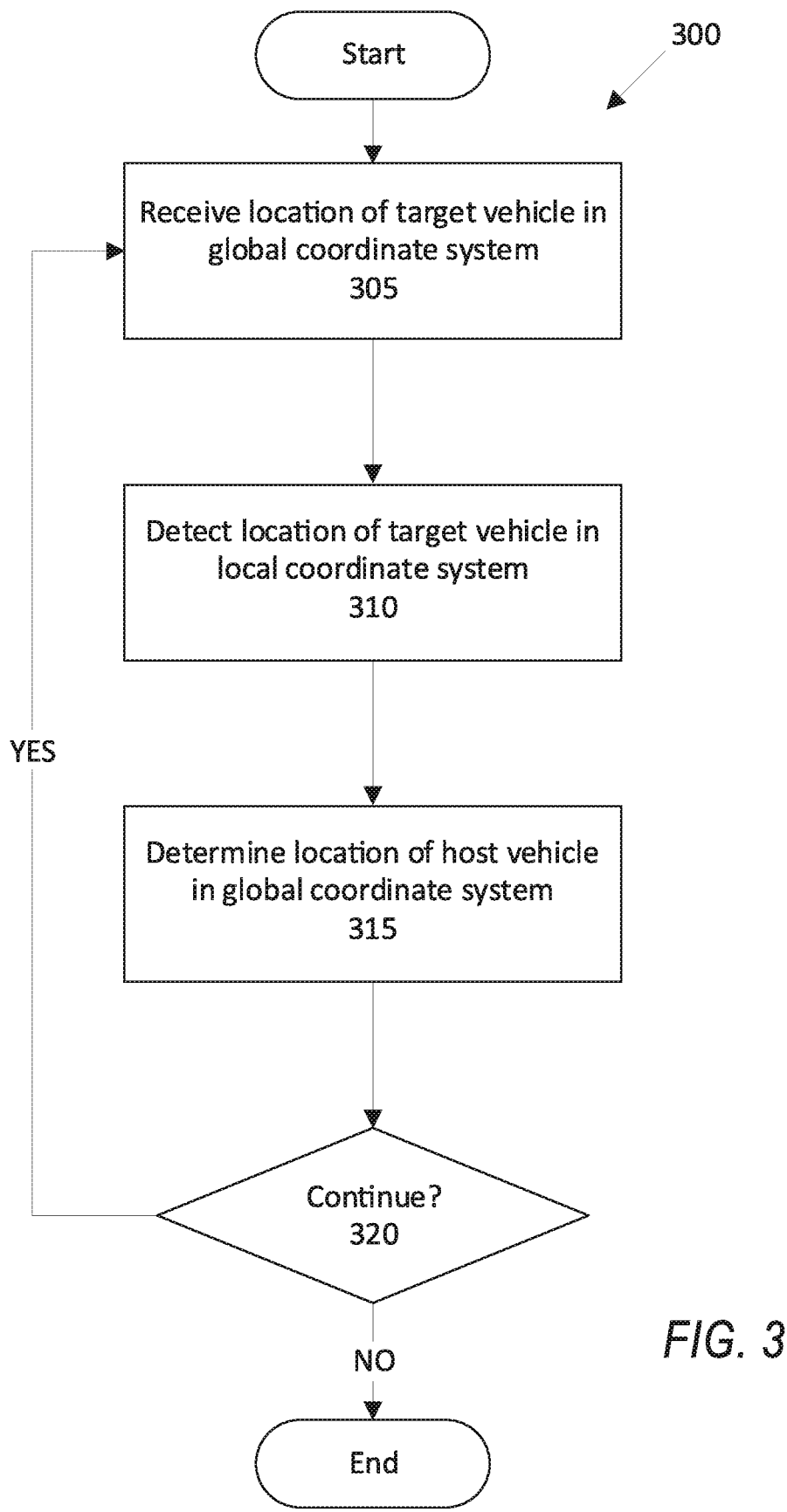
FIG. 3 is a block diagram of an example process for determining the location of the vehicle.

FIG. 3 is a diagram of an example process 300 for determining a location of a host vehicle 101. The process 300 begins in a block 305, in which a computer 105 of the host vehicle 101 receives a location of a target vehicle 205, 210 in a global coordinate system. For example, as described above, a lead vehicle 205 of a platoon 200 can determine its position in the global coordinate system with, e.g., high-resolution GPS, lidar data, etc. The lead vehicle 205 can send the position of the lead vehicle 205 in the global coordinate system to nearby vehicles, e.g., the computer 105 of the host vehicle 101.

Next, in a block 310, the computer 105 detects the location of the target vehicle 205, 210 in a local coordinate system. As described above, the computer 105 can actuate one or more sensors 110 to determine a location of the target vehicle 205, 210 in a local coordinate system, i.e., a Cartesian coordinate system having an origin at the host vehicle 101. For example, the computer 105 can actuate a radar to determine a distance between the host vehicle 101 and the target vehicle 205, 210 that corresponds to a specific set of coordinates in the local coordinate system.

Next, in a block 315, the computer 105 determine the location of the host vehicle 101 in the global coordinate system. As described above, the computer 105 can determine the location of the host vehicle 101 in the global coordinate system by adding, with vector addition, the distance from the host vehicle 101 to the target vehicle 205, 210 in the local coordinate system to the location of the target vehicle 205, 210 in the global coordinate system. For example, the computer 105 can use Equations 1-2 described above to determine the location of the host vehicle 101 in the global coordinate system.

Next, in a block 320, the computer 105 determines whether to continue the process 300. For example, the computer 105 can determine to continue the process 300 while the host vehicle 101 remains in the platoon 200. If the computer 105 determines to continue, the process 300 returns to the block 305. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   receive in a host vehicle, from a target vehicle via wireless vehicle-to-vehicle communications, a target vehicle first location in a global coordinate system, the target vehicle first location including a target latitude and a target longitude;
   actuate a sensor to determine a distance between the host vehicle and the target vehicle in a local coordinate system that has an origin at the host vehicle;
   determine, based on the distance between the host vehicle and the target vehicle, a target vehicle second location in the local coordinate system; and
   identify a host vehicle location in the global coordinate system based solely on a sum of (i) a lateral component of the target vehicle second location and the target longitude and (ii) a longitudinal component of the target vehicle second location and the target latitude.

2. The system of claim 1, wherein the instructions further include instructions to identify the location of the host vehicle based on a resolution error of the target vehicle first location.

3. The system of claim 1, wherein the instructions further include instructions to receive sensor data from the target vehicle and to deactivate one or more sensors in the host vehicle that collect a same type of sensor data as the received sensor data.

4. The system of claim 1, wherein the instructions further include instructions to receive a second target vehicle first location in the global coordinate system via wireless vehicle-to-vehicle communications, to determine a second target vehicle second location in the local coordinate system, and to identify the host vehicle location in the global coordinate system based on the second target vehicle first location and the second target vehicle second location.

5. The system of claim 1, wherein the instructions further include instructions to input images of the target vehicle into a machine learning program to identify the location of the target vehicle in the local coordinate system.

6. The system of claim 1, wherein the instructions further include instructions to receive respective locations of each of a plurality of vehicles in the global coordinate system via vehicle-to-vehicle communications and to determine the location of the host vehicle in the global coordinate system based on the received locations.

7. The system of claim 1, wherein the instructions further include instructions to determine the location of the host vehicle in the global coordinate system based on locations of a plurality of vehicles in the local coordinate system.

8. The system of claim 1, wherein the target vehicle is a lead vehicle in a platoon, and the host vehicle is in the platoon.

9. A method, comprising:
receiving in a host vehicle, from a target vehicle via wireless vehicle-to-vehicle communications, a target vehicle first location in a global coordinate system, the target vehicle first location including a target latitude and a target longitude;
actuating a sensor to determine a distance between the host vehicle and the target vehicle in a local coordinate system that has an origin at the host vehicle;
determining, based on the distance between the host vehicle and the target vehicle, a target vehicle second location in the local coordinate system; and
identifying a host vehicle location in the global coordinate system based solely on a sum of (i) a lateral component of the target vehicle second location and the target longitude and (ii) a longitudinal component of the target vehicle second location and the target latitude.

10. The method of claim 9, further comprising identifying the location of the host vehicle based on a resolution error of the location of the target vehicle in the global coordinate system.

11. The method of claim 9, further comprising receiving sensor data from the target vehicle and deactivating one or more sensors in the host vehicle that collect a same type of sensor data as the received sensor data.

12. The method of claim 9, further comprising receiving a second target vehicle first location in the global coordinate system via wireless vehicle-to-vehicle communications, determining a second target vehicle second location in the local coordinate system, and identifying the host vehicle location in the global coordinate system based on the second target vehicle first location and the second target vehicle second location.

13. The method of claim 9, further comprising inputting images of the target vehicle into a machine learning program to identify the location of the target vehicle in the local coordinate system.

14. The method of claim 9, further comprising receiving respective locations of each of a plurality of vehicles in the global coordinate system via wireless vehicle-to-vehicle communications and determining the location of the host vehicle in the global coordinate system based on the received locations.

15. The method of claim 9, further comprising determining the location of the host vehicle in the global coordinate system based on locations of a plurality of vehicles in the local coordinate system.

16. The method of claim 9, wherein the target vehicle is a lead vehicle in a platoon, and the host vehicle is in the platoon.

17. A system, comprising:
a vehicle sensor;
means for receiving in a host vehicle, from a target vehicle via wireless vehicle-to-vehicle communications, a target vehicle first location in a global coordinate system, the target vehicle first location including a target latitude and a target longitude;
means for actuating the vehicle sensor to determine a distance between the host vehicle and the target vehicle in a local coordinate system that has an origin at the host vehicle;
means for determining, based on the distance between the host vehicle and the target vehicle, a target vehicle second location in the local coordinate system; and
means for identifying a host vehicle location in the global coordinate system based solely on a sum of (i) a lateral component of the target vehicle second location and the target longitude and (ii) a longitudinal component of the target vehicle second location and the target latitude.

18. The system of claim 17, further comprising means for receiving sensor data from the target vehicle and deactivating one or more sensors in the host vehicle that collect a same type of sensor data as the received sensor data.

19. The system of claim 17, further comprising means for receiving a second target vehicle first location in the global coordinate system via wireless vehicle-to-vehicle communications, determining a second target vehicle second location in the local coordinate system, and identifying the host vehicle location in the global coordinate system based on the second target vehicle first location and the second target vehicle second location.

20. The system of claim 17, further comprising means for receiving respective locations of each of a plurality of vehicles in the global coordinate system via wireless vehicle-to-vehicle communications and determining the location of the host vehicle in the global coordinate system based on the received locations.

* * * * *